US008184655B2

United States Patent
Roy et al.

(10) Patent No.: US 8,184,655 B2
(45) Date of Patent: May 22, 2012

(54) WIRELESS COMMUNICATION METHOD AND WLAN FOR SIGNALING DEFERRAL MANAGEMENT MESSAGES

(75) Inventors: Vincent Roy, Montreal (CA); Paul Marinier, Brossard (CA)

(73) Assignee: InterDigital Technology Corporation, Wilmington, DC (US)

( * ) Notice: Subject to any disclaimer, the term of this patent is extended or adjusted under 35 U.S.C. 154(b) by 988 days.

(21) Appl. No.: 11/402,606

(22) Filed: Apr. 12, 2006

(65) Prior Publication Data

US 2006/0251032 A1 Nov. 9, 2006

Related U.S. Application Data

(60) Provisional application No. 60/673,679, filed on Apr. 21, 2005.

(51) Int. Cl.
*H04L 12/413* (2006.01)
*H04W 84/02* (2009.01)
*H04W 4/00* (2009.01)
*H04W 72/04* (2009.01)

(52) U.S. Cl. ......... 370/445; 370/230; 370/338; 455/69; 455/453; 455/522

(58) Field of Classification Search ............ 370/338, 370/445, 447, 229–230; 455/453, 522, 69
See application file for complete search history.

(56) References Cited

U.S. PATENT DOCUMENTS

| 6,169,886 | B1 * | 1/2001 | Black et al. ............ 455/522 |
| 7,698,550 | B2 | 4/2010 | Abhishek et al. | |
| 2001/0028639 | A1 * | 10/2001 | Eikelenboom et al. ....... 370/338 |
| 2002/0154653 | A1 | 10/2002 | Benveniste | |
| 2002/0172186 | A1 * | 11/2002 | Larsson ................ 370/349 |
| 2003/0179708 | A1 * | 9/2003 | Kamerman et al. ......... 370/338 |
| 2004/0047324 | A1 | 3/2004 | Diener | |

(Continued)

FOREIGN PATENT DOCUMENTS

JP  06-169312  6/1994

(Continued)

OTHER PUBLICATIONS

IEEE Wireless LAN Edition, A Compilation Based on IEEE Std 802.11—1999 (R2003) and Its Amendments.

(Continued)

*Primary Examiner* — Nick Corsaro
*Assistant Examiner* — Tangela T. Chambers
(74) *Attorney, Agent, or Firm* — Volpe and Koenig, P.C.

(57) ABSTRACT

A deferral management method is implemented in a wireless local area network (WLAN) including an access point (AP) and a plurality of wireless transmit/receive units (WTRUs). The AP sends a deferral management capabilities request message to the WTRUs to determine the deferral management capabilities of the WTRUs. In response, each of the WTRUs sends a deferral management capabilities indicator message to the AP. The AP may also send a deferral management parameter set message to the WTRUs to indicate values for setting deferral management parameters. In response, each of the WTRUs may optionally send a deferral management parameter set execution confirmation message to the AP. The WTRUs may also set the values of various deferral management parameters in accordance with a certain rule specified in a deferral management rule message sent by the AP. Optionally, the WTRUs may respond to the AP with a deferral management rule execution confirmation message.

20 Claims, 1 Drawing Sheet

U.S. PATENT DOCUMENTS

| | | | |
|---|---|---|---|
| 2004/0059825 A1 | 3/2004 | Edwards et al. | |
| 2004/0180652 A1* | 9/2004 | Jang et al. | 455/522 |
| 2005/0048997 A1* | 3/2005 | Grobler et al. | 455/550.1 |
| 2005/0059422 A1* | 3/2005 | Rudolf et al. | 455/522 |
| 2005/0064817 A1 | 3/2005 | Ginzburg | |
| 2005/0195786 A1* | 9/2005 | Shpak | 370/338 |
| 2005/0250528 A1* | 11/2005 | Song et al. | 455/522 |
| 2005/0281278 A1 | 12/2005 | Black et al. | |
| 2006/0046739 A1* | 3/2006 | Blosco et al. | 455/453 |
| 2006/0062183 A1* | 3/2006 | Forte et al. | 370/331 |
| 2006/0084460 A1* | 4/2006 | Matsuo et al. | 455/522 |
| 2006/0178151 A1* | 8/2006 | Lappetelainen et al. | 455/450 |
| 2007/0223403 A1* | 9/2007 | Furuskar et al. | 370/278 |

FOREIGN PATENT DOCUMENTS

| | | |
|---|---|---|
| WO | 98/23109 | 5/1998 |

OTHER PUBLICATIONS

LAN MAN Standards Committee of the IEEE Computer Society, *Information technology—Telecommunications and information exchange between systems—Local and metropolitan area networks—Specific Requirements, Part 11: Wireless LAN Medium Access Control (MAC) and Physical Layer (PHY) Specifications, ANSI/IEEE Std. 802.11, 1999 (R2003)*, (1999, Reaffirmed Jun. 12, 2003).

IEEE 802.11v/D0.02, *Draft Amendment to Standard for Information Technology—Telecommunications and Information Exchange Between Systems—LAN/MAN Specific Requirements—Part 11: Wireless Medium Access Control (MAC) and Physical Layer (PHY) Specifications, Amendment v: Wireless Network Management*, Mar. 2006.

* cited by examiner

WIRELESS COMMUNICATION METHOD AND WLAN FOR SIGNALING DEFERRAL MANAGEMENT MESSAGES

CROSS REFERENCE TO RELATED APPLICATION

This application claims the benefit of U.S. Provisional Application No. 60/673,679 filed Apr. 21, 2005, which is incorporated by reference as if fully set forth.

FIELD OF INVENTION

The present invention is related to a wireless local area network (WLAN). More particularly, the present invention is related to implementing deferral management strategies in the WLAN.

BACKGROUND

A wireless local area network (WLAN), such as for example, (but not limited to), an IEEE 802 WLAN, uses a carrier-sense multiple access/collision avoidance (CSMA/CA) scheme to share a wireless medium (WM) among a plurality of wireless transmit/receive units (WTRUs), (i.e., mobile stations (STAs)). This scheme forces the WTRUs to sense whether or not the WM is idle or busy before transmitting a packet. This is performed using a clear channel assessment (CCA) function. If a WTRU senses that the channel is busy, (later referred to as a WTRU hearing another transmission), the WTRU cannot transmit its packet and has to wait until the channel is idle before trying to win contention of the channel. This is referred to as deferring. By preventing two WTRUs which hear each other from transmitting simultaneously, the CSMA/CA scheme controls the level of interference in the system.

A low level of interference in a WLAN indirectly improves the capacity of the system as the throughput achieved on each radio link increases as interference decreases. On the other hand, the costs associated with preventing two nodes that hear each other from transmitting simultaneously on the same channel are realized in that scarce spectrum channel resources cannot be reused, thus leading to capacity constraints in systems where multiple base station systems (BSSs) use the same channel.

In CSMA/CA systems, the determination of whether or not a first WTRU defers to a second WTRU, (where the second WTRU is located at a given path loss from first WTRU), depends on two factors: (1) the transmission power used by the first WTRU; and (2) the reception/deferring thresholds used by second WTRU. It is therefore possible to control the level of deferral, and thus the capacity, in a WLAN by controlling either one or both of these factors. Two key reception/deferral thresholds may be used in the CCA functions of WTRUs operating in CSMA/CA, which are: (1) the energy detect threshold (EDT), which represents the smallest received signal power for which reception of a packet will be attempted; and (2) the defer threshold (DT), which represents the smallest received signal power for which transmission of a packet by the WTRU will be deferred.

In summary, it is sometimes better from the point of view of capacity to decrease the transmission power and/or to increase the DT/EDT of WTRUs in co-channel BSSs such that the WTRUs from one of the BSSs do not defer to those of another one of the BSSs, and vice-versa. However, problems may arise if the adjustment of deferral parameters is performed individually at each WTRU without consideration for the effect of this adjustment to other WTRUs. For instance, if a WTRU reduces its transmission power excessively, it can become impossible for other WTRUs in the same BSS to detect the signal from this WTRU above the EDT or DT, and a hidden node situation would arise, resulting in degraded capacity. Hidden nodes phenomena across BSSs may also occur. For the optimization to work properly, coordination between the WTRUs is needed to allow gathering all the required information at the node making the decision on the setting of the deferral parameters. This node could be the WTRU itself or an access point (AP) to which the WTRU is associated. In the latter case, coordination is also needed to allow the AP to communicate the values of the optimal deferral parameters to the concerned WTRU(s).

SUMMARY

The present invention is related to a deferral management method which is implemented in a WLAN including an AP and a plurality of WTRUs. The AP sends a deferral management capabilities request message to the WTRUs to determine the deferral management capabilities of the WTRUs, such as maximum transmission power, minimum transmission and/or dynamic range, minimum and maximum DT/EDT, and different CCA modes. In response, each of the WTRUs sends a deferral management capabilities indicator message to the AP. The AP may also send a deferral management parameter set message to the WTRUs to indicate values for setting deferral management parameters, which include message destination identification, configuration time limit, and transmission power settings. In response, each of the WTRUs may optionally send a deferral management parameter set execution confirmation message to the AP. In an alternative embodiment, the WTRUs may set the values of various deferral management parameters in accordance with a certain rule specified in a deferral management rule message sent by the AP. Optionally, the WTRUs may respond to the AP with a deferral management rule execution confirmation message containing the actual values of the deferral management parameters resulting from the execution of the rule.

The present invention relates to wireless systems using a CSMA/CA scheme such as for example, (but not limited to), the IEEE 802 family of standards. Deferral management strategies are implemented in a coordinated manner between all WTRUs. In medium and relatively large wireless systems, deferral management strategies can increase the system capacity by factors of more than 500%. One particular example where the present invention applies is within the scope of the IEEE 802.11v standard.

The present invention provides the mechanisms that enable the WTRUs of a BSS to set their deferral management parameters in a coordinated manner that will ultimately enable deferral management policies to fully capitalize on the potential increase in capacity they can offer.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Although the features and elements of the present invention are described in the preferred embodiments in particular combinations, each feature or element can be used alone (without the other features and elements of the preferred embodiments) or in various combinations with or without other features and elements of the present invention.

When referred to hereafter, the terminology "WTRU" includes but is not limited to a user equipment (UE), mobile station, fixed or mobile subscriber unit, pager, or any other type of device capable of operating in a wireless environment. When referred to hereafter, the terminology "AP" includes but is not limited to a base station, a Node-B, a site controller or any other type of interfacing device in a wireless environment.

The present invention provides two preferred embodiments for implementing deferral management. In the first embodiment, an AP directly communicates to at least one of its associated WTRUs the values at which these WTRUs should set their deferral management parameters. In the second embodiment, an AP communicates to at least one of its associated WTRUs the rules for calculating and setting their own deferral management parameters.

There are two preferred signaling procedures for allowing the deferral management parameters of WTRUs to be controlled by an AP on an individual basis. The first signaling procedure allows the AP to indicate to at least one WTRU the deferral parameters that the at least one WTRU should use. The second signaling procedure allows an AP to collect measurements from at least one WTRU that are relevant for the determination of the deferral parameters that the at least one WTRU should use.

Figure 1:
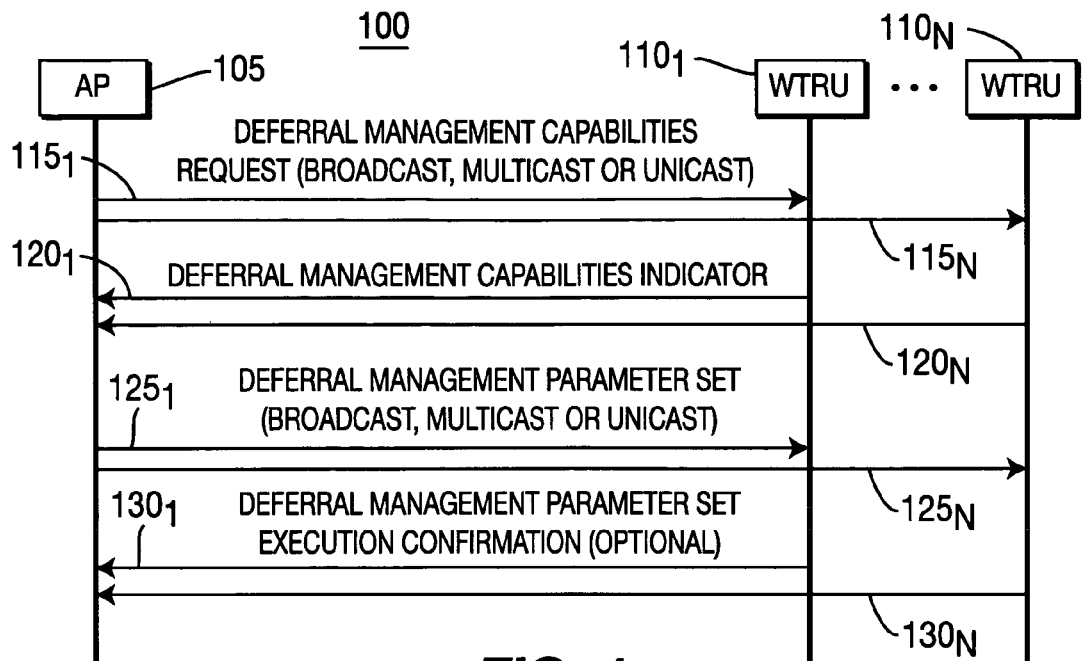
FIG. 1 is a signal flow diagram of a deferral management signaling procedure in which an AP defines deferral parameters to be used by a plurality of WTRUs in accordance with the present invention.

FIG. 1 is a flow diagram of the first signaling procedure which is implemented in a wireless communication system, (e.g., WLAN) 100 including an AP 105 and a plurality of WTRUs $110_1$-$110_N$. The AP 105 sends a deferral management capabilities request message 115 to one WTRU or multiple WTRUs to report its deferral management capabilities. The deferral management capabilities request message 115 may be transmitted as a broadcast, multicast or unicast signal. The deferral management capabilities include the following parameters:

1) Maximum transmission power, minimum transmission power and/or dynamic range of the WTRU;
2) Minimum DT/EDT and maximum DT/EDT that the WTRU can use; and
3) Different CCA (Clear Channel Assessment) modes that the WTRU supports.

A deferral management capabilities indicator message 120 may be sent by the WTRU(s) 110 as a response to the deferral management capabilities request message 115 sent by the AP 105, or may be sent as a stand-alone message. The deferral management capabilities indicator message 120 may be appended to such an association request message or to another message linked to an association/admission control procedure which manages the admission of the WRTU 110 in the WLAN 100.

A deferral management parameter set message 125 is sent from the AP 105 to one or more of the WTRUs 110 which indicates which values are to be set for its deferral management parameters. The deferral management parameter set message 125 may be transmitted as a broadcast, multicast or unicast signal, and preferably includes the following information:

1) The identification of the WTRU destination for the message is provided. Preferably, the identification would be a medium access control (MAC) address, but any other type of WTRU destination identifier may be used.
2) The time at which the configuration of a deferral management parameter of the WRTU according to a deferral management parameter set message needs to take place. Alternatively, the deferral management parameter set message 125 may indicate the time limit at which the configuration needs to have taken place. The time information can be expressed as a time offset or in absolute terms.
3) The deferral management parameters and the values that the WTRU needs to use. Examples of such parameters are:
   a) Transmission power settings in normal operations.
   b) Transmission power settings in special operations. Examples of special operations include but are not limited to scanning operations and measurement collecting.
   c) DT/EDT settings in normal operations.
   d) DT/EDT settings in special operations. Examples of special operations include but are not limited to scanning operations and measurement collecting.
   e) CCA mode(s).

As shown in FIG. 1, a deferral management parameter set execution confirmation message 130 may be optionally sent by the WTRU(s) 110 to confirm to the AP 105 that the configuration indicated in a given deferral management parameter set message 125 has taken place. The optional deferral management parameter set execution confirmation message 130 may include any of the parameters specified in the deferral management parameter set message described above or can refer to a transaction identifier that would associate the deferral management parameter set execution confirmation message 130 to the corresponding deferral management parameter set message 125. The reason for specifying the deferral management in the deferral management parameter set execution confirmation message 130 would be to allow the AP 105 to report the actual parameters that were set according to the deferral management parameter set message 125. For example, if the AP 105 tells the WRTU 110 to set its transmission power to 0 dBm and its EDT to −75 dBm, it is possible that the WRTU 110 lowered its EDT to −75 dBm and also lowered its power but was unable to lower it below 13 dBm. In that case, the WRTU 110 could send a deferral management parameter set execution confirmation message 130 indicating the actual settings of the configuration which could be achieved by providing the same type of information as what can be found in the deferral management parameter set message 125.

Figure 2:
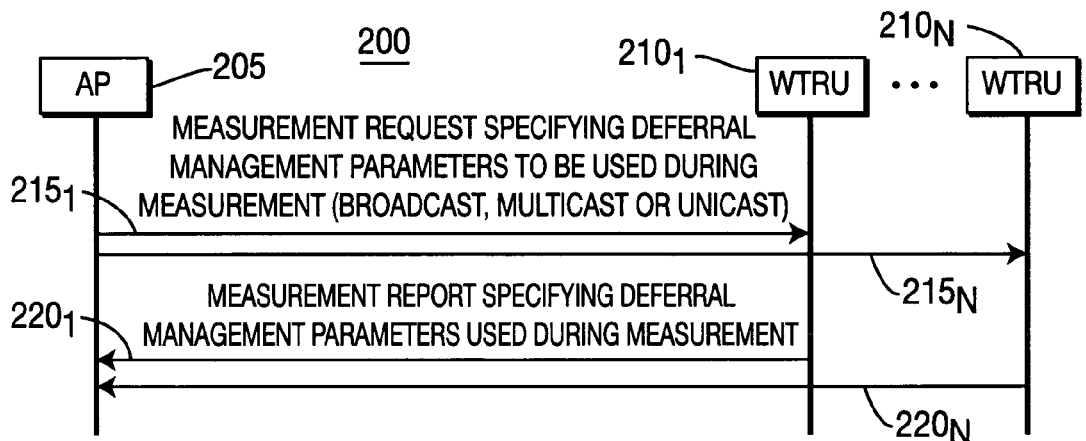
FIG. 2 is a signal flow diagram of a deferral management signaling procedure used during WTRU measurements in accordance with the present invention.

FIG. 2 is a flow diagram of the second signaling procedure which is implemented in a wireless communication system 200 including an AP 205 and a plurality of WTRUs $210_1$-$210_N$. The second signaling procedure allows the AP 205 to collect measurements from WTRU(s) 210 that are relevant for the determination of the deferral parameters that WTRU(s) 210 should use. Relevant measurements include, but are not limited to:

1) Signal strength (or average thereof) of packets that a WTRU receive from other specific WTRUs.
2) Number and total duration of packets received by a WTRU that originate from other specific WTRUs.

This signaling procedure compensates for the possibility that the deferral management parameters that are optimal in terms of providing capacity during normal operations may not be optimal when the WTRU 210 needs to perform measurements, such as during the scanning period. For instance, in a particular situation where it is desirable that a given WTRU 210 increase its DT/EDT in normal operations, a high DT/EDT might impair the ability of the WTRU 210 from accurately measuring certain metrics such as channel occupancy. To prevent such an impairment, the AP 205 indicates, as part of a measurement request, which deferral management parameter a WTRU should use when collecting measurements.

As shown in FIG. 2, a measurement request message 215 is sent by the AP 205 to the WTRU(s) 210 which indicates what type of measurement the WTRUs 210 are to perform and which deferral management parameter, (e.g., DT/EDT, CCA mode, or the like), should be used when collecting the requested measurement. A measurement report message 220 is sent by the WTRU(s) 210 to the AP 205 which indicates the results of the measurement and which deferral management parameters, (e.g., DT/EDT, CCA mode, or the like), were actually used to collect the reported measurement. The messages 215 and 220 may be used separately or together. The deferral management parameters used during measurement may be different than those requested by the AP 205 in the measurement request message 215. Using the measurements collected from its associated WTRUs 210, the AP 205 can perform calculations and determine the optimum deferral parameters to use for each WTRU 210. For instance, one possible strategy is to set the EDT of a given WTRU 210 to the smallest signal strength, (minus a margin), of packets that this WTRU 210 receives from other WTRUs 210 in the same BSS.

As explained earlier, there is a need for the deferral management to be performed in a coordinated manner across all WTRUs in order for the system to fully capitalize on the capacity gain that can be achieved by deferral management. Previously, signaling mechanisms were presented which allow an AP to actively determine the values and set the deferral management parameters of each of its associated WTRU in a direct fashion. This strategy ensures that the deferral management parameter settings for each WTRU are coherent since they are calculated at a central location, (i.e., the AP). On the other hand, this centralized scheme relies on the fact that the AP collects a significant amount of measurements and signaling from the WTRUs. For example, for an AP to be able to determine the DT/EDT value a WTRU should use such that the WTRU does not defer to a given co-channel extra-BSS WTRU, the AP may need to determine the signal strength of packets that the WTRU receives from the extra-BSS WTRU.

An alternative scheme that reduces the amount of signaling needed in the system is to have each WTRU responsible for determining and setting the values of their deferral management parameters, but to have the AP set the guidelines or rules that WTRUs have to follow when determining the values and setting their deferral management parameters. Such a scheme provides consistency between the deferral management strategy used by each WTRU while relieving the system from some of the signaling between the WTRU and the AP.

Figure 3:
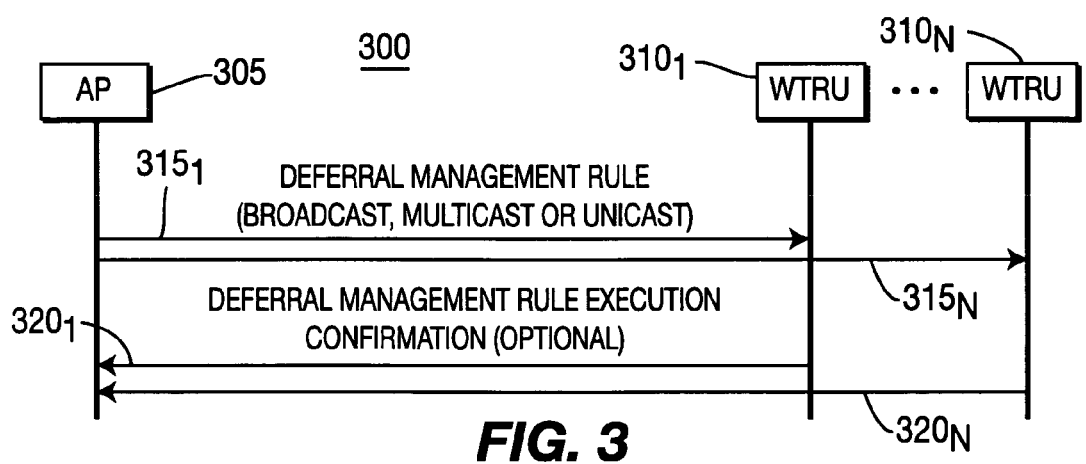
FIG. 3 is a signal flow diagram of a deferral management signaling procedure in which deferral management rules used by at least one WTRU are defined by the AP in accordance with the present invention.

FIG. 3 shows a signaling procedure which is implemented in a wireless communication system 300 including an AP 305 and a plurality of WTRUs $310_1$-$310_N$. The AP 305 sends a deferral management rule message 315 to at least one WTRU 310 that specifies a certain rule that the WTRU 310 has to follow for the determination of the values to use for its deferral management parameters. Optionally, after having calculated the proper setting of the deferral management parameters according to the rule sent by the AP 305, the WTRU 310 may respond to the AP 305 with a deferral management rule execution confirmation message 320 containing the actual value(s) of the deferral management parameter(s) resulting from the execution of the rule. This information can be subsequently used by the AP 305 when sending deferral management rule messages 315 to other WTRUs 310.

The information that has to be conveyed to the WTRU 310 by the AP 305 depends to some extent on the rule that the AP 305 wants enforced. Below are examples of generic but novel rules that can be used as well as the input parameters the AP 305 would typically have to provide to enable the WTRU 310 to implement the rule.

The first rule specifies which WTRUs are to be deferred to by the WTRU(s) 310. This rule tells the WTRU(s) 310 that it should set its DT/EDT to the highest possible value such that it can hear a certain set of WTRUs. In one embodiment, the AP 305 could choose the set of WTRUs to be all WTRUs in the BSS. That would imply that the WTRUs 310 would set their DT/EDT parameters as high as possible while still ensuring that they hear all WTRUs in their BSS.

In the preferred embodiment, the rules the WTRU 310 needs to follow and the list of the WTRUs the WTRU 310 needs to defer to can be included in a single message, but could also be conveyed in two separate messages in another embodiment. The message could also specify a margin M that the WTRU 310 should use when determining the value of the parameter. For example, if the WTRU 310 determines that the maximum value at which it would hear all its neighbors is DT/EDT of −85 dBm, a margin of 3 dB would imply that the WTRU 310 would have to set its DT/EDT parameter to −85 dBm−margin=−88 dBm.

This rule could be summarized by the following equation:

$$DT/EDT_{WTRU} = \text{min\_function}(\max DT/EDT_1, \max DT/EDT_2, \ldots \max DT/EDT_N) - M \quad \text{Equation (1)}$$

where max $DT/EDT_n$ is the maximum DT/EDT required to hear $WTRU_n$, where n is a WRTU identifier and M represents the margin, all of these values being provided by the AP 305.

Another preferred rule specifies to the WTRU 310 the set of WTRUs by which it needs to be heard. This rule tells the WTRU 310 that it should set its transmission power to the lowest possible value that ensures it will be heard by a certain set of WTRUs.

In one embodiment, the AP 305 chooses the set of WTRUs to include all WTRUs in the BSS. That would imply that the WTRUs 310 would set their transmission power at the lowest possible value that ensures that it is heard by all WTRUs in their BSS.

In the preferred embodiment, the rules the WTRUs 310 need to follow and the list of the WTRUs the WTRU 310 needs to ensure it is heard by would be included in a single message but could also be conveyed in two separate messages in another embodiment. The message could also specify the DT/EDT value used by each of the WTRUs needing to hear the WTRU 310. The message could also include a margin that the WTRU 310 should use when determining the value of the transmission power parameter. For example, if the WTRU 310 determines that a power 8 dBm would allow it to be heard by hear all the WTRUs specified in the list provided from the AP 305, a margin of 3 dB would imply that the WTRU 310 would set its transmission power to 8 dBm+margin=11 dBm.

The message could also specify the minimum transmission rate the WTRU 310 should not go beyond while reducing its transmission power.

This rule could be summarized by the following equations:

$$Tx\_Power_{WTRU} = \max\_function(\min\_function(\min Tx\_Power_1, \min Tx\_Power_2, \ldots \min Tx\_Power_N) + M), \min Tx\_Power_{RATE}) \quad \text{Equation (2)}$$

where min $Tx\_Power_i$=DT/EDT value of $WTRU_i$+pathloss between $WTRU_i$ and WTRU and min $Tx\_Power_{RATE}$ is the minimum transmission power to achieve desired transmission rate, and min $Tx\_Power_n$ is the minimum transmission power required to be heard by $WTRU_n$ where n is a WRTU identifier.

Although the features and elements of the present invention are described in the preferred embodiments in particular combinations, each feature or element can be used alone or in various combinations with or without other features and elements of the present invention.

What is claimed is:

1. A method of deferral management for use in an access point (AP), the method comprising:
    transmitting a first message to request a report of deferral management capabilities of a wireless transmit/receive unit (WTRU), wherein the first message includes regulatory requirements supported by the AP;
    receiving a second message, wherein the second message includes a deferral management capabilities indicator and regulatory requirements supported by the WTRU; and
    transmitting a third message in response to the second message, wherein the third message includes additional regulatory requirements including a transmission power parameter and a clear channel assessment energy detect (CCA-ED) parameter.

2. The method of claim 1 further comprising:
    receiving a response message in response to transmitting the third message indicating acceptance of the additional regulatory requirements.

3. The method of claim 1 wherein the third message includes at least one of maximum transmission power, minimum transmission power, or dynamic range.

4. The method of claim 1 wherein the third message includes at least one of a minimum defer threshold (DT)/energy detect threshold (EDT) for the WTRU and a maximum DT/EDT for the WTRU.

5. The method of claim 1 further comprising:
    comparing deferral management capabilities of a plurality of WTRUs associated with the access point (AP); and
    determining an optimal energy detect threshold (EDT) for the plurality of WTRUs associated with the AP.

6. The method of claim 1 wherein the third message is transmitted as a unicast signal.

7. A method of deferral management for use in a wireless transmit/receive unit (WTRU), the method comprising:
    receiving a first message requesting a report of deferral management capabilities, wherein the first message includes regulatory requirements supported by an access point (AP);
    transmitting a second message, wherein the second message includes a deferral management capabilities indicator and regulatory requirements supported by the WTRU; and
    receiving a third message in response to the second message, wherein the third message includes additional regulatory requirements including a transmission power parameter and a clear channel assessment energy detect (CCA-ED) parameter.

8. The method of claim 7 further comprising:
    transmitting a response message in response to receiving the third message indicating acceptance of the additional regulatory requirements.

9. The method of claim 7 wherein the third message includes at least one of maximum transmission power, minimum transmission power, or dynamic range.

10. The method of claim 7 wherein the third message includes at least one of a minimum defer threshold (DT)/energy detect threshold (EDT) for the WTRU and a maximum DT/EDT for the WTRU.

11. An access point (AP) for deferral management, the AP comprising:
    a transmitter configured to transmit a first message to request a report of deferral management capabilities of a wireless transmit/receive unit (WTRU), wherein the first message includes regulatory requirements supported by the AP;
    a receiver configured to receive a second message, wherein the second message includes a deferral management capabilities indicator and regulatory requirements supported by the WTRU; and
    wherein the transmitter is further configured to transmit a third message in response to the second message, wherein the third message includes additional regulatory requirements including a transmission power parameter and a clear channel assessment energy detect (CCA-ED) parameter.

12. The AP of claim 11, wherein
    the receiver is further configured to receive a response message in response to transmitting the third message indicating acceptance of the additional regulatory requirements.

13. The AP of claim 11, wherein the third message includes at least one of maximum transmission power, minimum transmission power, or dynamic range.

14. The AP of claim 11, wherein the third message includes at least one of a minimum defer threshold (DT)/energy detect threshold (EDT) for the WTRU and a maximum DT/EDT for the WTRU.

15. The AP of claim 11, further comprising:
    a processor configured to compare deferral management capabilities of a plurality of WTRUs associated with the AP, and to determine an optimal energy detect threshold (EDT) for the plurality of WTRUs.

16. The AP of claim 11, wherein the transmitter is further configured to transmit the third message as a unicast signal.

17. A wireless transmit/receive unit (WTRU) for deferral management, the WTRU comprising:
    a receiver configured to receive a first message to request a report of deferral management capabilities of the WTRU, wherein the first message includes regulatory requirements supported by an access point (AP);
    a transmitter configured to transmit a second message, wherein the second message includes a deferral management capabilities indicator and regulatory requirements supported by the WTRU; and
    wherein the receiver is further configured to receive a third message in response to the second message, wherein the third message includes additional regulatory requirements including a transmission power parameter and a clear channel assessment energy detect (CCA-ED) parameter.

18. The WTRU of claim 17, wherein the transmitter is further configured to transmit a response message in response to receiving the third message indicating acceptance of the additional regulatory requirements.

19. The WTRU of claim 17 wherein the third message includes at least one of maximum transmission power, minimum transmission power, or dynamic range.

20. The WTRU of claim 17 wherein the third message includes at least one of a minimum defer threshold (DT)/energy detect threshold (EDT) for the WTRU and a maximum DT/EDT for the WTRU.

\* \* \* \* \*